Dec. 11, 1962     B. G. GLAZER ETAL     3,068,405
PULSE CIRCUITS

Filed June 19, 1959     3 Sheets-Sheet 3

INVENTORS
EDWARD J. NOSSEN
& BURTON G. GLAZER
BY J. L. Whittaker
ATTORNEY

United States Patent Office 3,068,405
Patented Dec. 11, 1962

3,068,405
PULSE CIRCUITS
Burton G. Glazer, Collingswood, and Edward J. Nossen, Haddonfield, N.J., assignors to Radio Corporation of America, a corporation of Delaware
Filed June 19, 1959, Ser. No. 822,986
8 Claims. (Cl. 324—68)

The present invention relates to new and improved pulse measuring circuits.

An object of the invention is to provide new and improved apparatus for determining very precisely the time interval between two pulses.

Another object of the invention is to provide improved circuits for determining pulse width.

Another object of this invention is to provide an improved pulse measuring circuit which is especially suitable for use in digital, automatic tracking radar systems and other pulse-type, distance determining systems.

A typical embodiment of the present invention includes a delay line having a sending end and a mismatched receiving end. The interval between two pulses is measured by applying the pulses to the sending end and determining the point along the line at which the first applied pulse (which passes down the line and is reflected from the receiving end of the line) is time coincident with the second applied pulse. One preferred pulse position determining circuit includes a plurality of taps on the delay line and a diode connected to each tap and biased to conduct only upon the coincidence of two pulses.

In a form of the invention employed for pulse width determination, the input pulse is first differentiated to produce one pulse coincident with the leading edge of the input pulse and another pulse coincident with the lagging edge of the input pulse. These pulses are of opposite polarity. The delay line employed is short-circuited at its receiving end so that the first applied pulse is reflected from the receiving end in reverse polarity. Accordingly, the reflected leading edge pulse is of the correct polarity to add to the second applied lagging edge pulse and the point at which the two are coincident can readily be sensed.

The invention will be described in greater detail by reference to the following description taken in connection with the accompanying drawing in which:

FIG. 5 is a schematic circuit diagram of the circuit shown in block form in FIG. 4.

Similar reference numerals are applied to similar elements throughout the figures.

Figure 1:
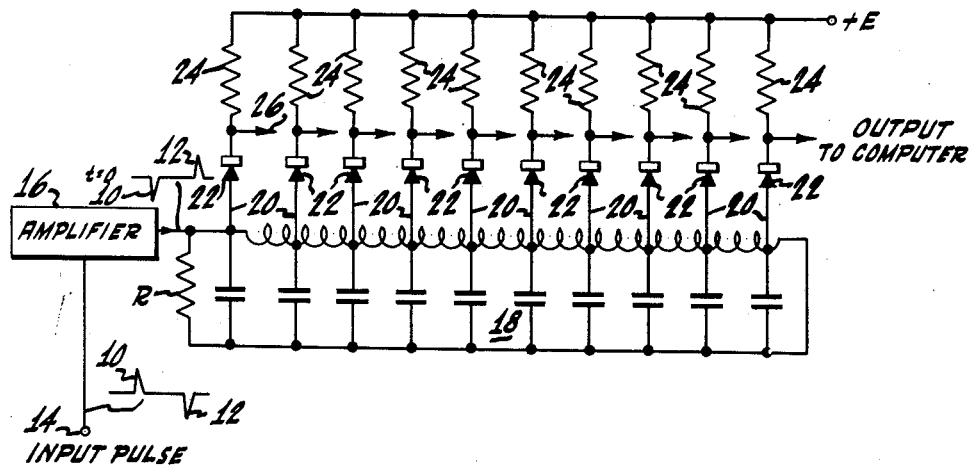
FIG. 1 is a block and schematic circuit diagram of one form of the present invention.
Figure 3:
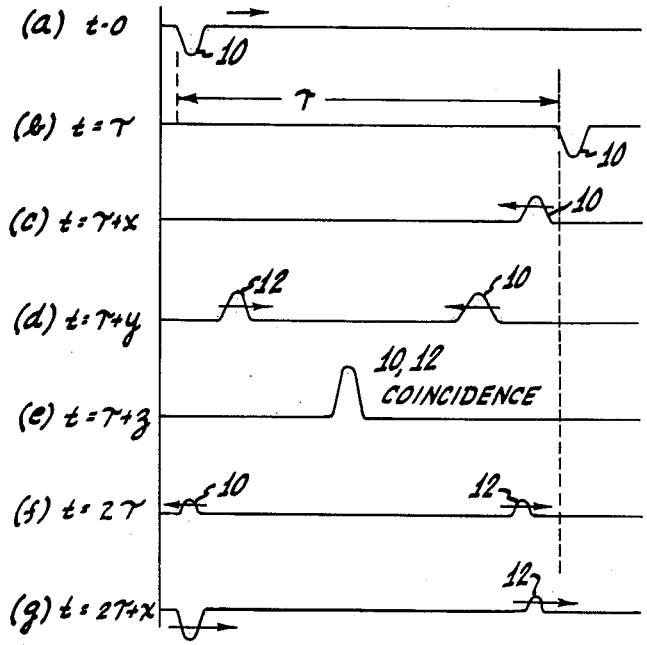
FIG. 3 is a drawing of waveforms present at various points in the circuit of FIG. 1.

FIGS. 1 and 3 should be referred to first. Input pulses 10, 12 are applied to the input terminal 14 of amplifier 16. The first pulse 10, the one occurring at $t=0$, is positive going and the second pulse 12 is negative going. These may be derived from a square pulse the width of which is to be determined or from separate sources as, for example, separate transmitting stations. It is desired to determine the interval of time between pulses 10 and 12.

Amplifier 16 amplifies and inverts pulses 10 and 12 and applies them to the sending end of delay line 18. The delay line is terminated in its characteristic impedance $R_c$ at its sending end and is short-circuited at its receiving end. Accordingly, each of the input pulses is reflected when it reaches the receiving end and is also reversed in polarity in the process.

A plurality of equally spaced terminals 20 are connected to the delay line and diodes 22 are connected to said terminals. The anodes of the diodes are connected to terminals 20 and the cathodes are connected through resistors 24 to a source of biasing voltage $+E$. The value of the biasing voltage is such that the coincidence of two positive pulses at a diode is required to cause that diode to conduct.

The circuit operation may more readily be understood by referring to FIG. 3. The ordinate in FIG. 3 is representative of pulse amplitude and the abcissa of the pulse position along the delay line. At time $t=0$ the first pulse 10 which is of negative polarity is at the sending end of the delay line. After a time $t=\tau$, where $\tau$ is the one way delay introduced by the line, pulse 10 is at the receiving end of the line. A short time $x$ later, pulse 10 is reflected from the short-circuited receiving end of the line and appears in reverse polarity as shown in FIG. 3c. Shortly thereafter ($t=\tau+y$) the second pulse 12 is applied to the sending end of the delay line. As can be seen in FIG. 3d, pulse 12 is traveling toward the receiving end of the line and pulse 10 is traveling toward the sending end. At time $t=\tau+z$, pulses 10 and 12 appear at the same point on the delay line, as shown in FIG. 3e. The two pulses together are of sufficient amplitude to overcome the bias on one of the diodes, whereby that diode conducts and an output voltage appears at the output terminal 26 of that diode. This pulse is a digital indication of the spacing between the two input pulses and it may be applied, after proper processing, to a computer or other indicating device. The positions of the pulses a short time later is shown in FIG. 3g.

Referring again to FIG. 1, relay line 10 is terminated at its sending end in an impedance R which, taken with the amplifier impedance, terminates the line in its characteristic impedance. The reflected pulses are therefore not re-reflected from the sending end and do not cause undesirable extraneous transients. However, as will be explained in more detail later, it is desirable for some purposes to select the reference (first) pulse of a pair of pulses and to recirculate it. Circuits are shown later which accomplish such recirculation.

Figure 2:
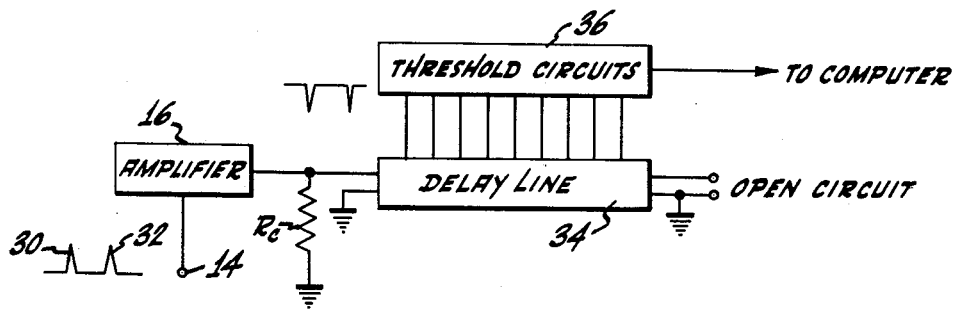
FIG. 2 is a block circuit diagram of another form of the present invention.

The embodiment shown in FIG. 2 is capable of measuring the time interval between two pulses 30, 32 of the same polarity. These pulses are applied from terminal 14 through amplifier 16 to delay line 34. This delay line is terminated at its sending end in its characteristic impedance $R_c$ and at its receiving end in an open circuit. Thus, the pulses reflected from the receiving end are of the same polarity as those reaching the receiving end. Threshold circuits 36 are similar to those illustrated in FIG. 1. The polarity of the diodes are dependent upon the polarity of the input pulses. In the embodiment chosen for illustration, the pulses applied to the delay line are of negative polarity and accordingly, the diodes should have their cathodes connected to the delay line terminals and their anodes to the biasing voltage. The biasing voltage, in this case, is negative rather than positive.

Figure 4:
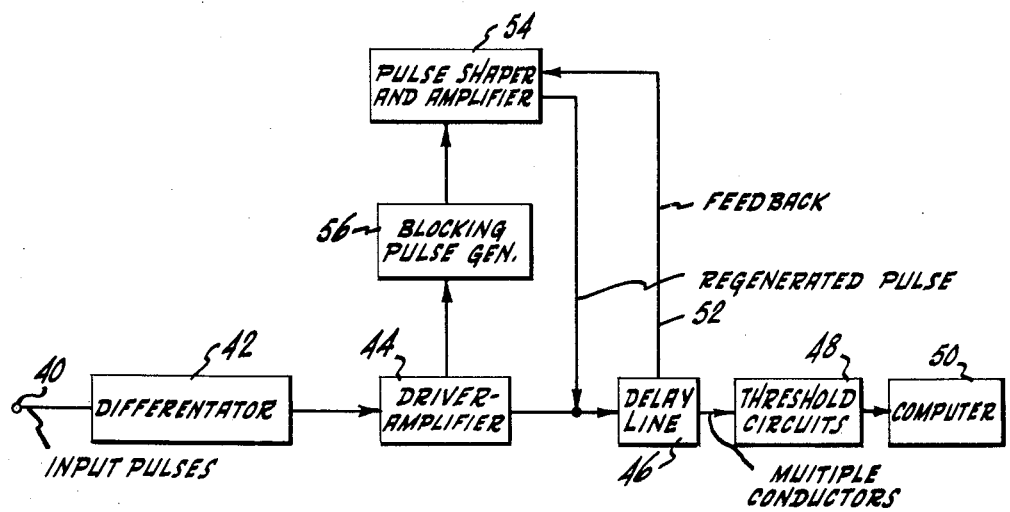
FIG. 4 is a more complete block diagram of an embodiment of the invention suitable for determining pulse width.

A circuit for pulse width determination is shown in FIG. 4. Square pulses or at least pulses with steep leading and lagging edges are applied to input terminal 40. These are differentiated by differentiator 42 and the differentiated pulses (two for each square wave) are applied through a driver-amplifier 44 to a short-circuited delay line 46. The first differentiated pulse of each pair is of one polarity and the second of opposite polarity. One of the diodes in threshold circuit 48 will be rendered conductive, the particular one depending upon the input square pulse width. The resultant digital signal is applied to computer 50.

In some cases the duration of the input square pulse and accordingly the spacing between the pair of differentiated pulses derived from the square pulse may be longer than twice the delay line duration. In these cases, it is desirable to recirculate the first pulse until there is coincidence between the first pulse and the later occurring pulse. This recirculation is accomplished by a feedback connection 52 from a diode close to the sending end of the delay line. The diode is properly poled to sense the first pulse after it is reflected from the receiving end of the delay line. The reflected pulse is applied through a pulse shaper and amplifier 54 to the input end of delay line 46. The shaper and amplifier introduce a delay sufficient to make the regenerated pulse occur precisely $2\tau$ later than the reference pulse, where $2\tau$ is the time required for a pulse to travel from the receiving to the sending end of the delay line. FIG. 3g shows the regenerated pulse position at time $2\tau+x$.

It will be remembered that the first or reference pulse of each pair of pulses applied to the delay line of one polarity and the second pulse of the pair is of another polarity. Accordingly, in the arrangement in which the reference pulse is continuously circulated, some means must be provided for discriminating against the second pulse. This is the reason for blocking pulse generator 56 connected between the driver-amplifier and the pulse shaper and amplifier 54. The blocking pulse generator senses the second pulse and, in response thereto, renders the pulse shaper and amplifier 54 inoperative for a period sufficient to permit the second pulse to pass the terminal to which lead 52 is connected.

A schematic diagram of the circuit shown in block form in FIG. 4 is illustrated in FIG. 5.

A negative going square pulse 60 is applied to input terminal 40. The pulse passes through coupling capacitor 62 to a differentiator 42. The elements of the differentiator include a resistor 64, inductance 66 and capacitor 68. The output of the differentiator consists of a negative going pulse 70 coincident with the leading edge of the square pulse and a positive going pulse 72 coincident with the lagging edge of the square pulse. For the purposes of the discussion which follows, pulse 70 is hereinafter referred to as the leading edge pulse and pulse 72 is referred to as the lagging edge pulse.

The leading and lagging edge pulses are applied to the base 74 of transistor 76. This transistor has two outputs the first at its emitter 78 and the second at its collector 80. The pulses at emitter 78 are of the same polarity as the input pulses and they are applied through a balanced transistorized driver amplifier 81 to the sending end 82 of delay line 46. In the amplification process, the leading and lagging edge pulses 70 and 72 respectively are reversed in polarity as shown in the sketch.

The leading edge pulse 70 travels down delay line 46 and is reflected from the far or receiving end in negative polarity. For the present in may be assumed that the interval between pulses 70 and 72 is less than 1 microsecond, the round trip delay time of the delay line 46. In this case, at some point along the line, the leading edge pulse, after reflection from the receiving end 84 of the line, will be in time coincidence with the lagging edge pulse 72. The coincident pulses will be of negative polarity and will appear at one of the taps. Assume for a moment that the pulses appear at the second tap 86. These pulses are applied from tap 86 via lead 88 to the diode 90. As has been previously explained, diode 90 and all corresponding diodes are biased to a point such that the coincidence of two pulses are required to make the diode conduct. Thus, when the coincident pulses appear at lead 88 and are applied to the cathode of the diode, they pass through the diode and are applied to the base 92 of transistor 94.

The negative pulse applied to base 92 of the transistor 94 is of sufficient amplitude to drive the transistor into heavy conduction. During the conducting interval, the capacitor 96 in the emitter circuit charges. Upon the termination of the coincident pulses applied to the base 92 of transistor 94, capacitor 96 discharges through resistor 98, thereby maintaining the emitter 100 of transistor 94 negative with respect to its previous value, and the transistor 94 is abruptly driven to cutoff. The cessation of collector current is sensed as a change of collector voltage. This change in voltage appears as a pulse at lead 102. Its width can be adjusted by choice of circuit components and it may be matched to the speed capability of external circuits.

Although diodes are shown connected only to the first two taps of the delay line, it will be appreciated that each tap is connected to a diode like 90 and each diode is connected to a transistor like 94. For the purpose of drawing simplicity, these are illustrated by the single block 104 in the dashed block legended "threshold circuits 48." Moreover, the threshold circuits are connected to a computer 50 which is shown in FIG. 4 but is not shown in FIG. 5.

Returning now to the left of FIG. 5, it will be remembered that transistor 76 has two outputs. The first, that is, the output at the emitter 78 has been discussed above. The second output which appears at collector 80 is inverted in polarity. The leading edge pulse 70 is now positive and it cannot pass through diode 108. The lagging edge pulse 72, however, is negative and it passes through diode 108 to the transistorized blocking pulse generator 56. The latter amplifies and stretches input pulse 72 to an extent sufficient to prevent the lagging edge pulse 72 from passing through pulse shaper and amplifier 54 as will be explained in greater detail shortly. This stretched pulse is applied via lead 110 to the emitter 112 of the output transistor 114 in stage 54.

Pulse amplifier and shaper 54 is the means for recirculating pulses in the delay line. For the purpose of the present discussion, assume now that the leading and lagging edge pulses are spaced an interval greater than 1 microsecond from one another. In this case, if the leading edge pulse were not recirculated when it reached the sending end of the line after reflection from the receiving end, the leading and lagging edge pulses would never be coincident. According to a feature of the present invention, the leading edge pulse 70, after reflection from the receiving end 84, arrives back at input terminal 86. This pulse is now of negative polarity and passes from terminal 86 via lead 116 through diode 118 to the transistorized blocking oscillator stage following. The output transformer 120 of the blocking oscillator includes a tertiary winding 122 which is connected in a manner to invert the output pulse with respect to the input trigger signal. This inverted, shaped pulse 124, which appears at the collector 126 of the transistor 114 is applied via lead 128 to the sending end 82 of the delay line. The delay introduced is sufficient so that the regenerated pulse is applied to the sending end exactly 1 microsecond after the leading edge pulse 70.

The lagging edge pulse 72 is of negative polarity when travelling from the sending end 82 of the delay line toward the receiving end 84. Thus, when it arrives at terminal 86, it is of proper polarity to be able to pass through diode 118 of the pulse shaper and amplifier 54. Accordingly, if the pulse shaper and amplifier 54 remained operative, the lagging edge pulse 72 would be recirculated which would be undesirable. However, as was explained previously, the lagging edge pulse 72 passes through blocking pulse generator 56 and the stretched and shaped pulse which results is applied to the emitter 112. This pulse is of the proper polarity to cut off transistor 114 and prevent recirculation of a regenerated lagging edge pulse 72.

Summarizing briefly the operation of the circuit described in detail above, the input square pulse 60 is differentiated in stage 42 and subsequently amplified to the proper power level in stage 80. The leading edge pulse 70 passes down the delay line and is reflected from the short-circuited receiving end 84. If the delay interval is 1 microsecond or less, there is coincidence at one of the taps of the delay line. The coincident pulses pass through a diode 90 to a transistor 94. The shaped output pulse results which may be applied to a computer. If the delay interval between pulses 70 and 72 is greater than 1 microsecond, the leading edge pulse is recirculated in the delay line by pulse shaper and amplifier 54. The number of times the pulse is recirculated may be counted by a counter connected to lead 130. The lagging edge pulse is prevented from being recirculated by blocking pulse amplifier 56.

It will be noted that an RLC differentiator 64, 66, 68 is used instead of an RC differentiator. This RLC differentiator is critically damped and it is preferred because it has a definite resonant frequency. This permits the leading and lagging edge pulse widths to be accurately controlled. The actual width desired depends upon the spacing of the delay line taps.

The computer 50 (FIG. 4) connected to the collectors of the threshold circuit stages (FIG. 5) may be of known type. For example, it may include an input bank of bistable multivibrators all of which are normally reset and one of which is subsequently set in response to an output pulse from one of these stages. Even more simply, an indicator consisting of a bank of neon lamps or the like may be employed to show the tap at which coincidence occurs.

The recirculation counter may also be of known type. The total delay between leading and lagging edge pulses is, of course, $n(2\tau)+\Delta\tau$, where $n$ is the number of times the leading edge pulse recirculates; $2\tau$ is the round-trip delay time of the delay line; and $\Delta\tau$ is time required after $n(2\tau)$ for the leading and lagging edge pulses to become coincident at one of the taps. It is measured simply by noting the particular tap at wich coincidence occurs. The counter may be turned off in response to a signal appearing at one of leads 102 and the delay line may be cleared of pulses in the same manner. For example, stage 114 may be blocked for 1 microsecond or so in response to such a pulse by a circuit like blocking pulse generator 56.

The speed of the basic circuit is considered in deciding whether a binary counter, a decimal counter or other device is used for the counter connected to lead 102. A typical decimal counter uses a beam switching tube for speeds up to 1 microsecond. Binary counters may be of the bistable flip-flop variety.

In a practical circuit, the pulses sent down the line had a width at the 50% amplitude point of about twice the time delay between taps. Since the pulses were almost triangular due to the frequency limiting response to the delay line and amplifiers, the width of the combined coincident pulse at the threshold level was only somewhat more than the delay time between taps. The combined width is preferably greater than the delay time in order always to obtain an output on at least one tap.

In the embodiment chosen for illustration, 10 taps are shown. It should be appreciated that this is meant to be illustrative rather than limiting since more or fewer than this number may be used. Ten taps are convenient if decimal readout is desired.

It has been found possible using the circuits described above to obtain very precise pulse measurements. In an embodiment of the invention employing a 0.5 microsecond delay line (1.0 microsecond round trip) it has been found possible to measure pulse spacing to an accuracy of ±0.05 microsecond. The widths of the pulses were slightly greater than 0.05 microsecond. Pulse measurement to this precision has important applications in digital shoran and other very precise distance determining systems. In these applications the precise measurement arrangement described is employed as an interpolation method for determining a fraction of an interval between two clock pulses.

The circuits described may also be used in digital early-late gate measuring systems. In these applications, an "on target" measurement can be made to produce a signal at a center tap on the delay line and early-late gate measurements to produce signals at terminals on either side of the center terminal.

The present invention has been found to be especially useful in the millimicrosecond region where other pulse measuring methods fail. It also has been possible to measure intervals longer than $2\tau$, the round trip period, by counting the number of times the first reference pulse is regenerated by the amplifier as previously explained.

What is claimed is:

1. Apparatus for determining the interval between two pulses comprising, in combination, a delay line having a sending end and a mismatched receiving end; means for applying said pulses to said sending end; and means for determining the point along the line at which the first applied pulse is time coincident with the second applied pulse, said last means including a plurality of pulse coincidence responsive devices each connected to a different point along said delay line.

2. Apparatus for determining the interval between two pulses, one of one polarity and the other of the other polarity comprising, in combination, a delay line having a sending end and terminated at its receiving end in a short-circuit; means for applying said pulses to said sending end; and means for determining the point along the line at which the first applied pulse is time coincident with the second applied pulse, said last means including a plurality of pulse coincidence responsive devices each connected to a different point along said delay line.

3. Apparatus for determining the interval between two pulses comprising, in combination, a delay line having a plurality of equally spaced terminals along its extent and which is mismatched at its receiving end; means for applying said pulses to the sending end of said delay line in such polarity that the first pulse after reflection from the mis-matched end of said line will be of the same polarity as the second pulse at the time said second pulse is applied to said line; and a plurality of biased diodes, one connected to each terminal, and each poled to conduct upon the coincidence of two pulses of the same polarity at the terminal to which it is connected.

4. A circuit for determining the width of a pulse, said circuit comprising, in combination, means for differentiating said pulse to obtain a first pulse coincident with the leading edge thereof and the second pulse of opposite polarity coincident with the lagging edge thereof; a delay line having a sending end and a short-circuited receiving end; means for applying said pulses to said sending end, whereby when the first pulse is reflected from the short-circuited end of the delay line, it is of the same polarity as the second pulse; and means for determining the point along the line at which the first applied pulse is time coincident with the second applied pulse.

5. A circuit for determining the width of a pulse, said circuit comprising, in combination, means for differentiating said pulse to obtain a first pulse coincident with the leading edge thereof and the second pulse of opposite polarity coincident with the lagging edge thereof; a delay line having a sending end and a short-circuited receiving end; means for applying said pulses to said sending end, whereby when the first pulse is reflected from the short-circuited end of the delay line, it is of the same polarity as the second pulse; means near the sending end of said line for receiving pulses reflected from the short-circuit end thereof and applying them in reverse polarity to the sending end of said line, whereby said reflected pulses are recirculated in the line; and means for determining the point along the line at which said first pulse is time coincident with said second pulse.

6. Apparatus for determining the interval between two pulses comprising, in combination, a delay line having a sending end terminated in its characteristic impedance and a mismatched receiving end; means for applying said pulses to said sending end; and means for determining the point along the line at which the first applied pulse is time coincident with the second applied pulse, said last means including a plurality of pulse coincidence responsive devices each connected to a different point along said delay line.

7. Apparatus as set forth in claim 6, wherein said receiving end is terminated in a short-circuit.

8. Apparatus as set forth in claim 6, wherein said receiving end is terminated in an open circuit.

References Cited in the file of this patent
UNITED STATES PATENTS

| | | |
|---|---|---|
| 2,188,970 | Wilson | Feb. 6, 1940 |
| 2,623,106 | Fassberg | Dec. 23, 1952 |
| 2,631,232 | Baracket | Mar. 10, 1953 |
| 2,905,887 | Taddeo | Sept. 22, 1959 |